United States Patent [19]
Ro et al.

[11] Patent Number: 5,982,726
[45] Date of Patent: Nov. 9, 1999

[54] MULTI-RATE OPTICAL DISC RECORDING AND REPRODUCING APPARATUS

[75] Inventors: Jin Tae Ro, Seoul; Dong Cheol Kang, Kyungki-Do; Jae Hyoung Lee, Seoul; Tae Joon Park, Seoul; Kang Soo Seo, Seoul, all of Rep. of Korea

[73] Assignee: LG Electronics, Inc., Seoul, Rep. of Korea

[21] Appl. No.: 08/752,037

[22] Filed: Nov. 19, 1996

[30] Foreign Application Priority Data

Oct. 19, 1996 [KR] Rep. of Korea ............. 96-46962

[51] Int. Cl.[6] ............................................. G11B 5/09
[52] U.S. Cl. .................................. 369/53; 369/50
[58] Field of Search ........................... 369/53, 50, 56, 369/47, 48, 54, 58, 116, 124, 59, 49, 32; 360/73.03, 73.01

[56] References Cited

U.S. PATENT DOCUMENTS 5,109,369  4/1992  Maeda et al. .......................... 369/50
5,224,087  6/1993  Maeda et al. .......................... 369/54
5,627,805  5/1997  Finkelstein et al. .................... 369/32
5,673,242  9/1997  Lin ....................................... 369/50
5,701,283  12/1997 Alon et al. ........................... 369/44.41

Primary Examiner—Ali Neyzari

[57] ABSTRACT

Multi-rate optical disc recording method and apparatus wherein data are recorded on the optical disc in accordance with a transfer rate of data, thereby preventing an unnecessary waste of a storage area in the optical disc and also enhancing a recording time of the optical disc. Said method and apparatus exploit a transfer rate detector for detecting a transfer rate of a digital signal generated at a digital signal source. This transfer rate detector allows a rotation velocity controller to rotate the optical disc at a speed corresponding to the transfer rate of the digital signal, in response to the transfer rate of the detected digital signal. Also, the transfer rate detector allows a recording portion to record the digital signal on the optical disc at the detected transfer rate.

4 Claims, 9 Drawing Sheets

MULTI-RATE OPTICAL DISC RECORDING AND REPRODUCING APPARATUS

BACKGROUND OF THE INVENTION

1. Field of the Invention

This invention relates to an optical disc recording and reproducing apparatus that optically accesses the optical disc, and more particularly recording method and apparatus of a multi-rate optical disc wherein the optical disc can be adaptively driven based on a transfer rate of data to be recorded.

2. Description of the Prior Art

In a conventional optical disc recording and reproducing apparatus, light beams are irradiated onto the optical disc such as Compact Disc (CD) and Digital Versatile (or Video) disc (DVD) in order to access data. Such optical discs record binary data representing audio signals, video signals, text information, etc.

Digital signals recorded onto the optical disc and reproduced therefrom include various recording signals such as a video signal, an audio signal, digital data or a digital broadcasting program including a combination of all of said signals, etc. Each of these signals has a different data quantity, for example digital bit quantity per second, respectively. Also, in the same broadcasting program, the data quantity is different according to the attribute of a broadcasted program. Specifically, the data quantity is about 6 to 7 Mbps in the case of a sports program, whereas the data quantity is generally about 3 to 4 Mbps in the case of a movie program. Moreover, the data quantity may differ according to the number of pixels of a program being provided. Specifically, the data quantity is about 5 to 6 Mbps in the case of the existed NTST and PAL signals having an array of about 720×480 pixels (normal video signal hereinafter), whereas the data quantity is generally about 10 to 15 Mbps in the case of a high density signal having an array of 1024×1024 pixels (high resolution signal hereinafter). Optical disc apparatuses must therefore be capable of recording and reproducing digital programs having such various data quantities.

However, a conventional optical disc has only a single-rate recording means. The following is a description of an example of a conventional optical disc recording and reproducing apparatus, which records and reproduces the normal video signal of 5 Mbps and the high resolution signal of 10 Mbps to/from a conventional optical disc. The conventional optical disc recording and reproducing apparatus drives the optical disc at a transfer rate of 10 Mbps on the optical disc. Consequently, when recording the high resolution video signal of 10 Mbps in a real time, the conventional optical disc recording and reproducing apparatus can exploit the entire recording area of the optical disc, that is, 100% of recording area in the optical disc. By contrast, when recording the normal video signal of 5 Mbps in real time, the conventional optical disc recording and reproducing apparatus wastes half the record area, that is, 50% of record area in the optical disc unnecessarily. Such a conventional optical disc recording and reproducing apparatus also wastes the recording area unnecessarily when recording the audio signal and the text signal with different transfer rates.

For reference, the following describes the process in which the high resolution video signal and the normal video signals are recorded, respectively, using the optical disc recording and reproducing apparatus.

FIG. 1 is a time chart for explaining the process in which the high resolution video signal of 10 Mbps is recorded by the optical disc recording and reproducing apparatus. The frame dividing signal FDS shown in FIG. 1 assigns odd number and even number frames of the video signal. The high logic region and the low logic region of the frame dividing signal FDS represent the odd number frames and the even number frames, respectively. The high resolution video data divided into frame units according to this frame dividing signal is inputted to optical disc recording and reproducing apparatus at a rate of 10 Mbps. Then, the optical disc recording and reproducing apparatus formats the high resolution video signal HVD in a certain form required by an optical disc, and records on the optical disc. At this time, the optical disc is rotated at a constant velocity by the optical disc recording and reproducing apparatus like DSS shown in FIG. 1. As a result of this, an information pit train IPT is formed on the information track of the optical disc having frame video data pits arranged continuously, as shown in FIG. 1.

FIG. 2 is a time chart for explaining the process in which the normal resolution video signal of 5 Mbps is recorded by the optical disc recording and reproducing apparatus. In FIG. 2, the normal video data NVD are divided into frame units by the frame dividing signal FDS. This normal video data is inputted to the optical disc recording and reproducing apparatus at a transfer rate of 5 Mbps, and formatted, like FNVD in FIG. 2, by the optical disc recording and reproducing apparatus. The formatted normal video data FNVD consists of compressed frame video data and null data inserted between the compressed frame video data. These null data are generated because the normal video data NVD of 5 Mbps is temporally compressed into ½ by the optical disc recording and reproducing apparatus operating at a rate of 10 Mbps. In turn, the formatted normal video data FNVD are recorded on the optical disc using the optical recording and reproducing apparatus. At this time, the optical disc rotates at the same velocity used to record the high resolution video data. As a result of this, an information pit train IPT is formed on the information track of the optical disc in which video data pit regions and null data pit regions are arranged alternately.

As described above, the conventional optical disc recording and reproducing apparatus causes the null data to be recorded on optical disc because it records data on the optical disc at a fixed transfer rate, regardless of the transfer rate of data. The conventional optical disc recording and reproducing apparatus therefore wastes the recording area of the optical disc unnecessarily.

SUMMARY OF THE INVENTION

An object of the present invention is to provide multi-rate optical disc recording method and apparatus which can prevent the unnecessary waste of the storage area of optical disc by recording data on the optical disc in response to the transfer rate of data.

In order to obtain the above object, a multi-rate optical disc recording method according to one aspect of the present invention comprises steps of detecting a transfer rate of the digital signal, controlling a rotation velocity of the optical disc in accordance with the transfer rate of the digital signal, and recording the digital signal on the optical disc.

A multi-rate optical disc recording method according to another aspect of the invention comprises steps of setting a recording speed of the digital signal, controlling a rotation velocity of the optical disc in accordance with the recording speed, converting a transfer rate of the digital signal in accordance with said recording speed, and recording the converted digital signal on the optical disc.

A multi-rate optical disc recording method according to another aspect of the invention, in an optical disc recording apparatus for accessing an optical disc optically, comprises steps of detecting a transfer rate of a first digital signal generated from a digital signal source, rotating the optical disc at a speed corresponding to the transfer rate of the first digital signal, deciding whether a second digital signal was recorded on the optical disc or not, and recording the first digital signal from a final position of the second digital signal in the optical disc.

A multi-rate optical disc recording method according to still another aspect of the invention, in an optical disc recording apparatus including an optical pickup for accessing a spiral information track on an optical disc optically, comprises steps of detecting a transfer rate of a first digital signal generated from a digital signal source, rotating the optical disc at a speed corresponding to a transfer rate of the first digital signal, deciding whether a second digital signal was recorded on the optical disc or not, comparing whether a transfer rate of the second digital signal is identical to that of the first digital signal, changing a rotation velocity of the optical disc into a speed corresponding to the transfer rate of the second digital signal, detecting a final position of the second digital signal on the information track and information about the final position, changing the rotation velocity of the optical disc into the speed corresponding to the transfer rate of said first digital signal, waiting until the rotation velocity of the optical disc arrives at the speed corresponding to the transfer rate of the first digital signal, jumping reversely the optical pickup into a position prior to the final position of the second digital signal, and applying the first digital signal to the optical pickup to record it on the optical disc.

Further, a multi-rate optical disc recording apparatus according to one aspect of the present invention comprises means for detecting a transfer rate of a digital signal from a digital signal source, optical disc driving means for rotating the optical disc in response to the transfer rate of the digital signal detected by the transfer rate detecting means, and means for recording the digital signal on the optical disc at the transfer rate detected by the transfer rate detecting means.

A multi-rate optical disc recording apparatus according to other aspect of the present invention comprises means for recording a digital signal from a digital signal source on an optical disc, record mode determining means for a recording speed of the digital signal, and means for controlling a rotation velocity of the optical disc in response to the recording speed determined by the record mode determining means.

A multi-rate optical disc recording apparatus according to another aspect of the present invention comprises means for detecting a transfer rate of a digital signal from a digital signal source, optical disc driving means for rotating the optical disc in response to the transfer rate of the digital signal detected by the transfer rate detecting means, and means for recording the digital signal on the optical disc at the transfer rate detected by the transfer rate detecting means.

A multi-rate optical disc recording apparatus according to still another aspect of the present invention comprises means for detecting a transfer rate of a digital signal from a digital signal source, buffer means for storing the digital signal from the digital signal source temporarily, variable clock generating means for generating a clock signal of variable frequency, disc driving means for rotating the optical disc, means for recording a digital signal stored in the buffer means on the optical disc in response to the clock signal from the variable clock generating means, and means for controlling the variable clock generating means and the disc driving means in response to the transfer rate detected by the transfer rate detecting means to control a frequency of the clock signal and a rotation velocity of the optical disc.

BRIEF DESCRIPTION OF THE DRAWINGS

These and other objects of the invention will become apparent from the following detailed description of the embodiments of the present invention with reference to the accompanying drawings, in which.

DETAILED DESCRIPTION OF THE PREFERRED EMBODIMENT

Figure 1:
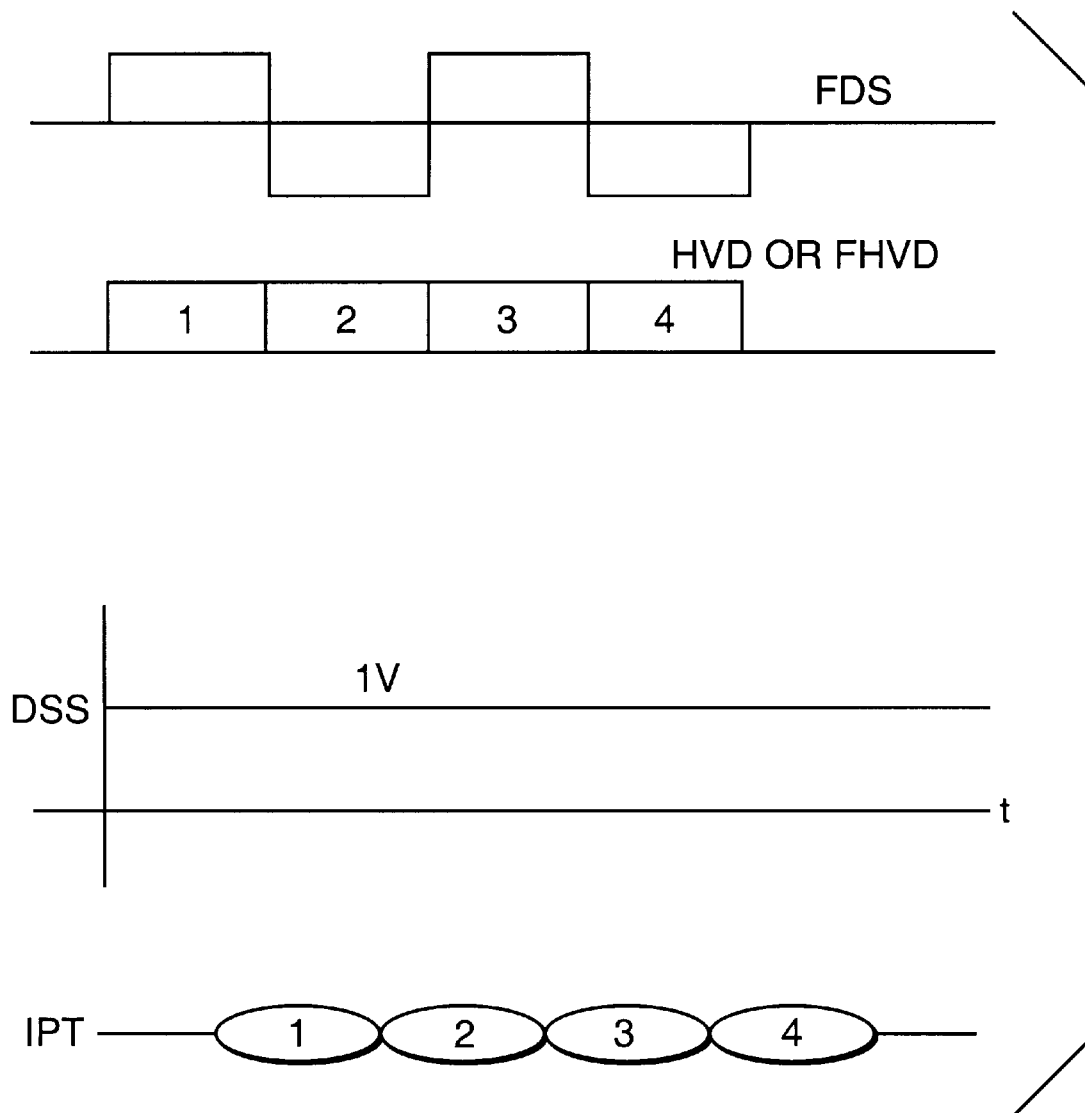
FIG. 1 shows a timing chart for explaining the process in which the high resolution video data are recorded on the optical disc by the conventional optical disc recording and reproducing apparatus.
Figure 2:
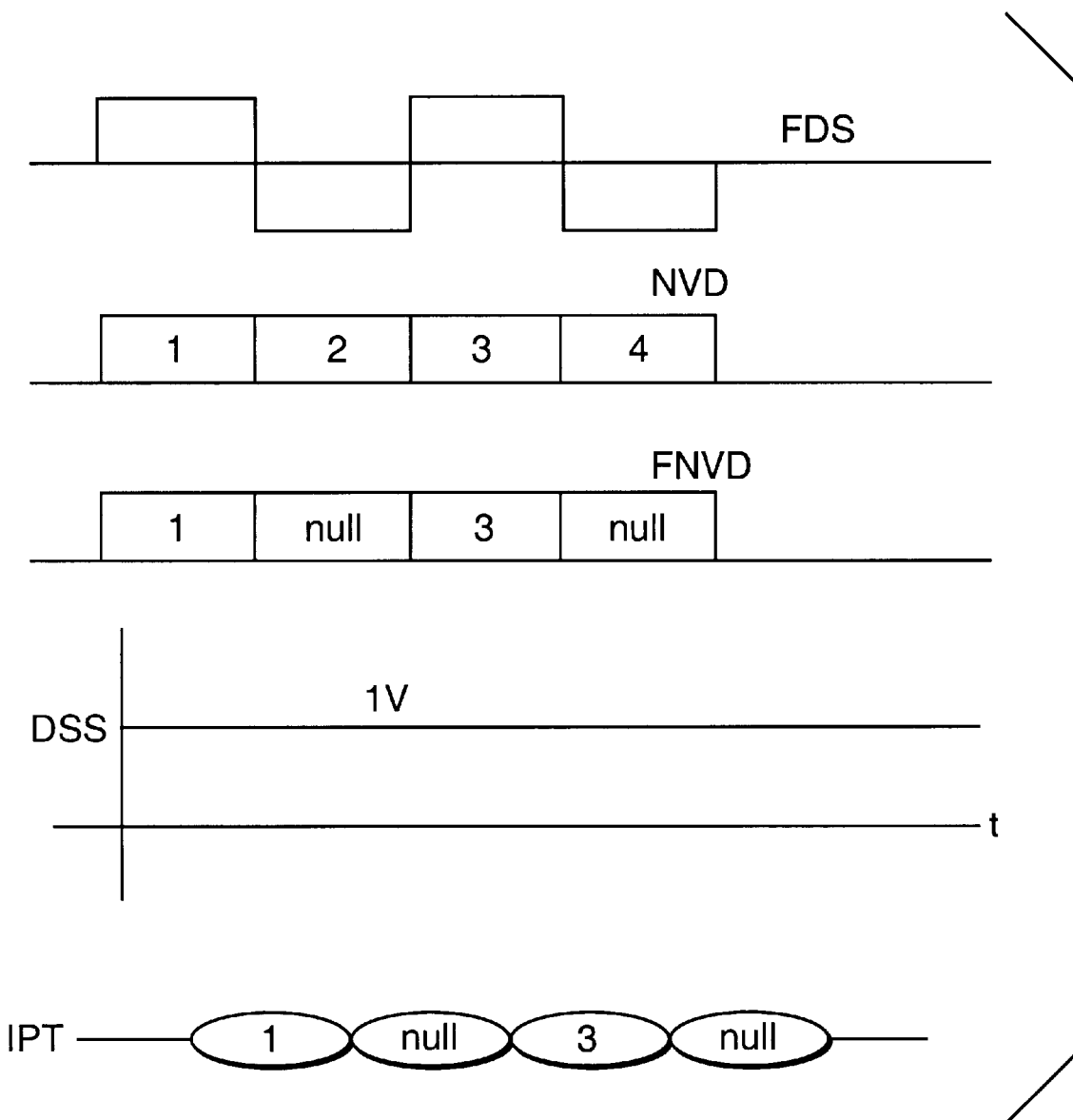
FIG. 2 shows a timing chart for explaining the process in which the normal video data are recorded on the optical disc by the conventional optical disc recording and reproducing apparatus.
Figure 3:
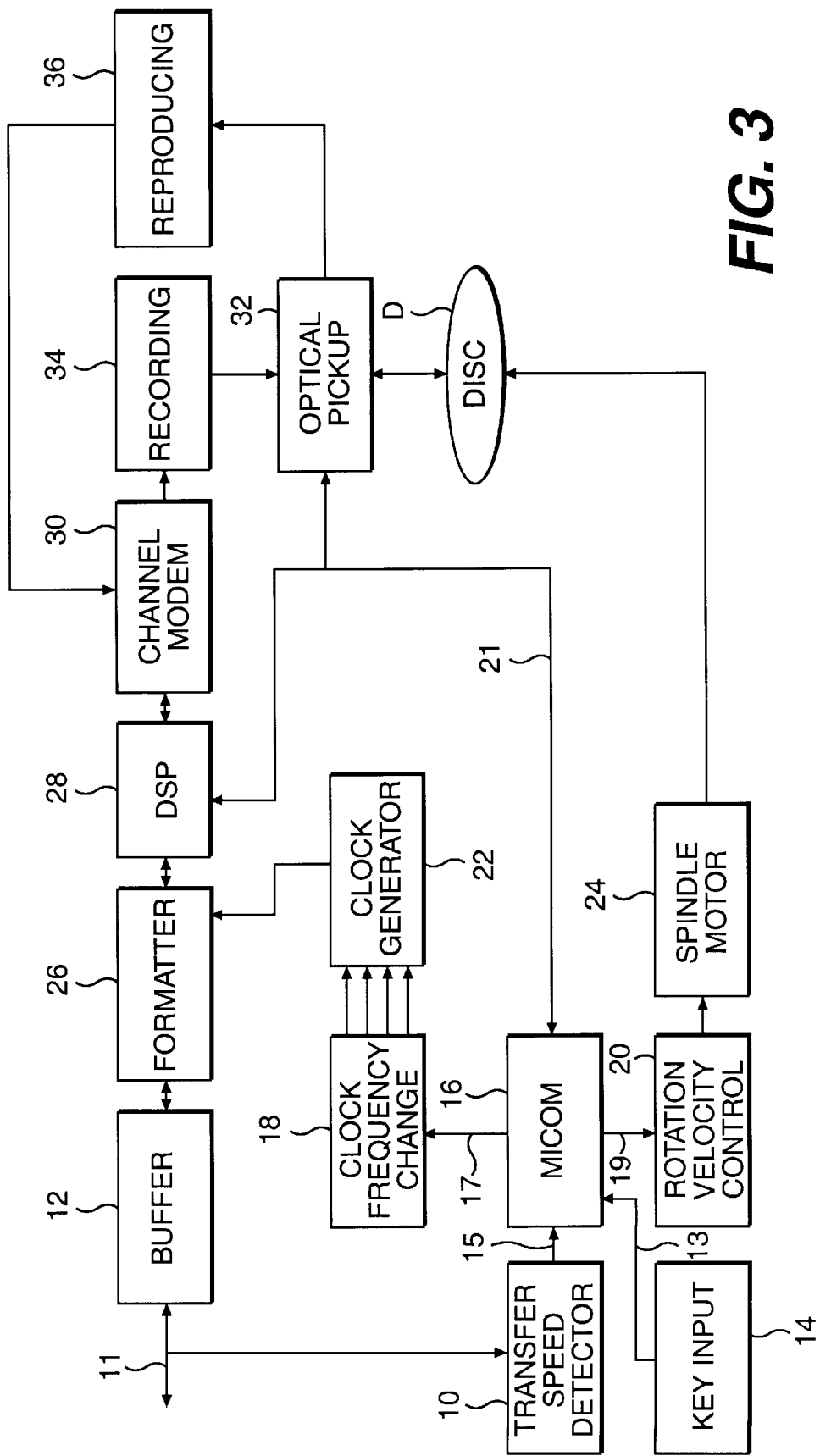
FIG. 3 is a block diagram of an optical disc recording and reproducing apparatus according to the preferred embodiment of the present invention.
Figure 5:
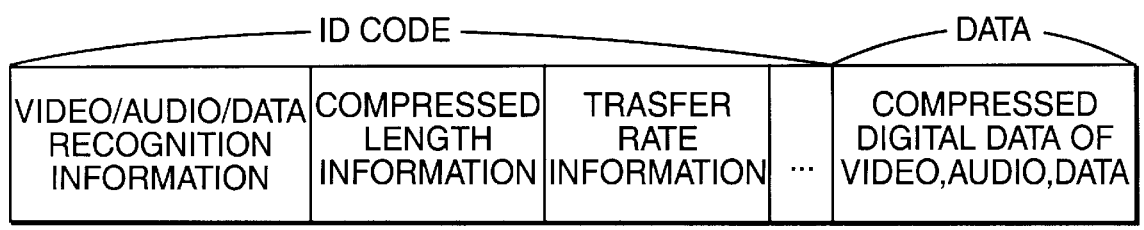
FIG. 5 provides a detailed illustration of the data format of the frame video data shown in FIG. 4.

Referring to FIG. 3, there is shown an optical disc recording and reproducing apparatus according to the preferred embodiment of the present invention which comprises a transfer rate detector 10 and a buffer 12 commonly connected an input/output line 11. The input/output line 11 is connected to a data source (not shown) in order to transfer the video data VDS from the data source into the buffer 12 or to transfer the video data VDS from the buffer 12 into the data source. This video data VDS is transferred in the shape of frame unit, as shown in FIG. 5 according to the frame dividing signal FDS. The frame video data consists of only data portions including information about pixels, or of both identification code portions including information about a transfer rate and data portions including information about pixels. The video data is classified into high resolution video data HVD and normal video data NVD in accordance with the number of pixels. The high resolution video data HVD is formed by formatting an array of 1024×1024 pixel data to one frame and making a moving picture compression of the formatted frame video data, which are transferred at a transfer rate of 10 Mbps. The normal video data NVD is formed by formatting an array of 325×525 pixel data to one frame, which is transferred at a transfer rate of 5 Mbps. The transfer rate detector 10 detects a transfer rate value of video data VDS from the identification portion included in the video data VDS from the input/output line 11. The transfer rate value is detected by the transfer rate detector 10 only when the identification code portion is included in the video data VDS. The buffer 12 temporarily stores the video data VDS inputted from the input/output line 11 and the reproduced video data to be transferred toward the input/output line 11. The buffer 12 has enough storage capacity to store two frame video data.

The optical disc recording and reproducing apparatus further comprises a key input portion 14 for sending an instruction assigned by a user via the first node 13 to microcomputer 16, a clock frequency change portion 18 connected to the microcomputer 16, and a rotational velocity control portion 20. The key input portion 14 inputs recording, reproducing and retrieval instructions from a user as well as virtual addresses intended to record and reproduce, and supplies the inputted instructions and addresses to the microcomputer 16 via the first node 13. Also, during recording, the key input portion 14 inputs a transfer rate value related to the data to be recorded, and supplies the transfer rate value to the microcomputer 16. For this purpose, the key input portion 14 includes key switches (not shown) and/or a keyboard.

In the recording mode, the microcomputer 16 generates clock frequency data and rotational velocity data in accordance with a transfer rate value inputted via the second node 15 from the transfer rate detector 10. Also, the microcomputer 16 generates the clock frequency data and the rotational velocity data corresponding to the transfer rate value from the key input portion 14 when the transfer rate value is not detected by the transfer rate detector 10. The clock frequency data is supplied to the clock frequency change portion 18 via the third node 17, and the rotational velocity data is supplied to the rotation velocity control portion 20 via the fourth node 19.

The clock frequency change portion 18 varies the frequency of the clock signal generated at a clock generator 22 in accordance with a logic value of the clock frequency data applied via the third node 17 from the microcomputer 16. The clock generator 22 generates the first clock signal FCS or the second clock signal SCS under control of the clock frequency change portion 18. The first clock signal FCS is generated when the video data VDS is inputted to the input/output line 11 at a transfer rate of 5 Mbps, which has a frequency of 5 MHz. For this, the clock generator 2 includes a voltage controlled oscillator (not shown), and the clock frequency change portion 18 includes a decoder (not shown) such as a digital-to-analog converter.

On the other hand, the rotational velocity control portion 20 rotates a spindle motor 14 at a speed corresponding to the rotational velocity data inputted via the fourth node 19 from the microcomputer 16. For example, the rotational velocity control portion 20, like DSV in FIG. 4, rotates the spindle motor 24 at a speed of 100 rps when the high resolution video data HVD of 10 Mbps is inputted to the input/output line 11. By contrast, rotational velocity control portion 20 rotates the spindle motor 24 at a speed of 50 rps when the normal video data NVD is inputted to the input/output line 11. In response to rotation of the spindle motor 24, the optical disc D is subject to rotate at a same velocity as the spindle motor 24.

Furthermore, the optical disc recording and reproducing apparatus comprises a formatter 26 connected with the buffer 12 in serial, a digital signal processor 28 (DSP hereinafter), and a channel modem 30. The formatter 26 formats the video data VDS from the buffer 12 into a pattern required by an optical disc D and, at the same time, applies the formatted video data to the buffer 12. Also, the formatter 26 reversely formats the reproduced video data from the DSP 28 into the original pattern and applies the reversely formatted video data to the buffer 12. The formatter 26 inputs the video data VDS stored in the buffer 12 at a rate of 10 Mbps or 5 Mbps in accordance with the clock signal from the clock generator 22. Specifically, the formatter 26 inputs the video data VDS from the buffer 12 at a rate of 10 Mbps when the first clock signal FCS is applied from the clock generator 22, while it inputs the video data VDS from the buffer 12 at a rate of 5 Mbps when the second clock signal SCS is applied from the clock generator 22.

Under control of the microcomputer 16, DSP 28 converts the video data from the formatter 26 into the form of a data bit stream or restores the video data from the reproduced data bit stream. Specifically, in the recording mode, DSP 28 detects a synchronous pattern and an address from a support signal demodulated from the channel modem 30, and supplies the detected synchronous pattern and address to the microcomputer 16. Also, DSP 28 converts the formatted video data from the formatter 26 into the form of a data bit stream. This data bit stream is to be added by an error correction code, an address and a synchronous pattern besides the video data, which is supplied to the channel modem 30. The support signal is a signal which is preformatted on the track in the optical disc, and includes a synchronous pattern indicating the rotation velocity of the optical disc D and an address indicating the physical position of the storage area In the reproduction mode, DSP 28 separates a video data, an error correction code, a synchronous pattern and an address from the reproduced data bit stream from the channel modem 30 and corrects an error generated in the video data by the error correction code. Also, DSP 28 applies the error corrected video data to the formatter 26 and supplies the synchronous pattern and the address to the microcomputer 16.

In the recording mode, the channel modem 30 channel-codes a data bit stream to be recorded from the DSP 28, and channel-decodes a support signal reproduced from the optical disc D and received through reproducing portion 36 and optical pickup 32. The channel-decoded support signal is applied to the DSP 28. In the reproduction mode, the channel modem 30 channel-decodes a data bit stream reproduced from the optical disc and supplies the channel-decoded data bit stream to DSP 28.

The optical disc recording and reproducing apparatus further comprises an optical pickup device 32 for accessing the optical disc D optically, and a recording portion 34 and a reproducing portion 36, which are connected between the channel modem 30 and the optical pickup device 32. Under control of the microcomputer 16 the optical pickup device 32 moves back and forth in a radial direction of the optical disc to record data on the track in the optical disc D or pick up information recorded on the track in the optical disc D. For this purpose, the optical pickup device 32 irradiates a relatively large energy of light beam onto the surface of the optical disc D in the recording mode. By contrast, it radiates a relatively small energy of light beam onto the surface of the optical disc D in the reproduction mode.

The recording portion 34 allows a light beam irradiated on the track in the optical disc D to be switched by controlling the optical pickup device 32 in accordance with the data bit stream from the channel modem 30. As a result, a data pit train WDP indicating "1" or "0" in accordance with the data bit stream is formed in such a manner that a spiral track is shaped in the optical disc D. In this data pit train WDP, HVDP represents the data pit train relative to one frame of high resolution video data and NVDP does the data pit train relative to one frame of normal video data.

The reproducing portion 36 processes a high frequency signal from the optical pickup device 32 to generate a support signal and a data bit stream from the high frequency signal. The support signal and the data bit stream generated at the reproducing portion 36 are supplied to the channel modem 30.

Figure 6:
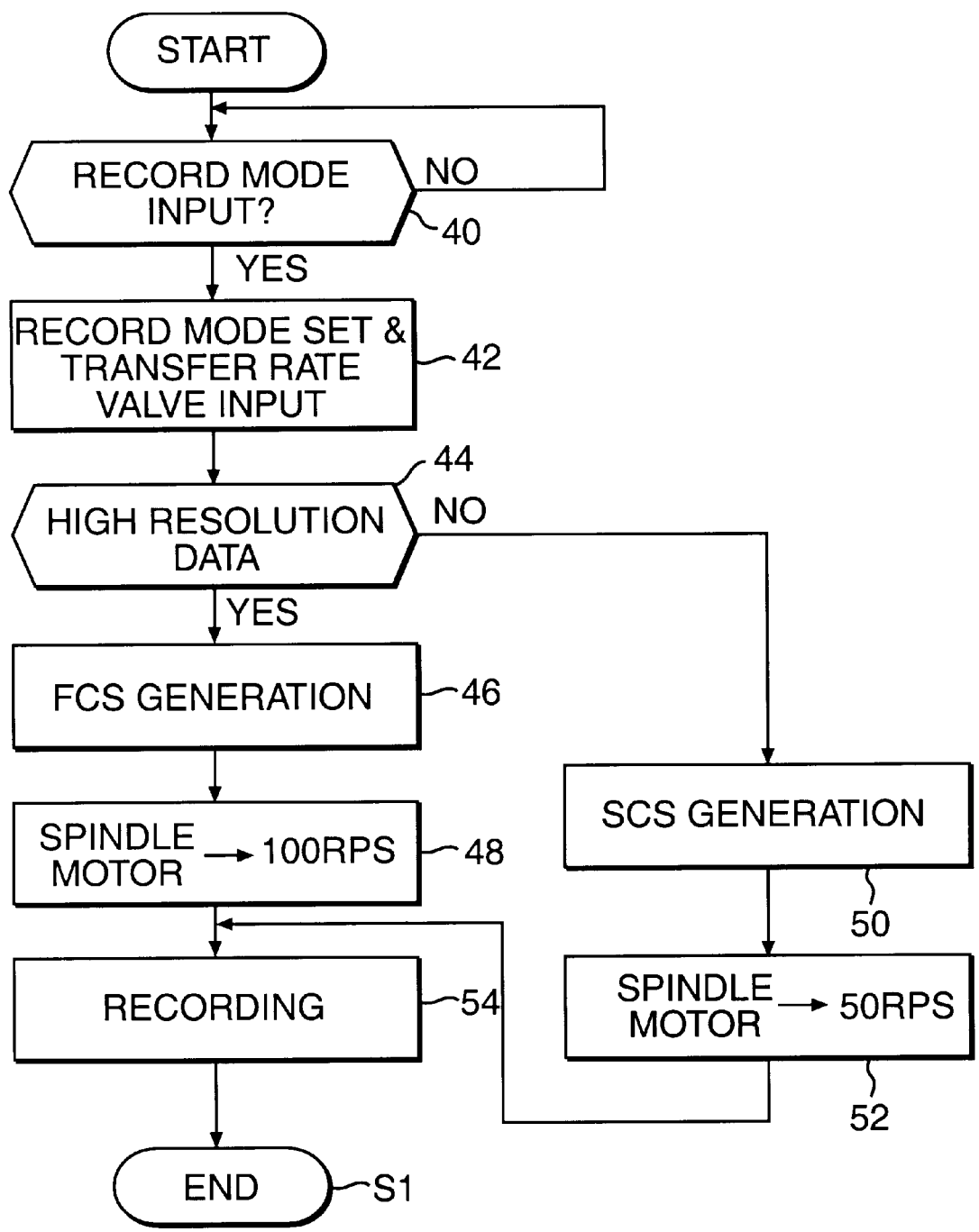
FIG. 6 is a flow chart for explaining a multi-rate recording method according to the first embodiment of the present invention.

FIG. 6 is a flow chart for explaining a multi-rate recording method according to the first embodiment of the present invention. The process in FIG. 6 is performed by the microcomputer 16.

Referring now to FIG. 6, in step 40, the microcomputer 16 waits until a record instruction is inputted from the key input portion 14. If the record instruction is inputted in step 40, then the microcomputer 16 sets a record mode flag assigned in a part of register therein, and inputs a transfer rate value of video data from the transfer rate detector 10 (step 42).

In step 44, the microcomputer 16 decides, based on the transfer rate value, if the video data VDS on the input/output line is high resolution video data HVD or normal video data NVD. When the transfer rate value is 10 Mbps, the microcomputer 16 decides that the high resolution video data HVD is being applied to the input/output line 11. When the transfer rate value is 5 Mbps, the microcomputer 16 decides that the normal video data NVD is being applied to the input/output line 11.

If it is decided that the high resolution video data HVD is applied to the input/output line 11 in step 44, then the microcomputer 16 allows the clock generator 22 to generate the first clock signal FCS of 10 MHz by controlling the clock generator 22 via the clock frequency change portion 18 (step 46). At this time, the formatter 26 inputs the high resolution video data HVD in the buffer 12 at a rate of 10 Mbps, by means of the first clock signal from the clock generator 22. As a result, the high resolution video data HVD recorded on the optical disc D is transferred at a rate of 10 Mbps by way of the formatter 26, the DSP 28, the channel modem 30, the recording portion 34 and the optical pickup device 32. Subsequently, the microcomputer 16 allows the rotational velocity controller 20 to rotate the spindle motor 24 at a speed of 100 rps by controlling the rotational velocity controller 20 (step 48). In response to a rotation of the spindle motor 24 at the speed of 100 rps, the optical disc D also is subject to rotate at a speed of 100 rps.

On the other hand, if it is decided that the normal video data NVD is applied to the input/output line 11 in step 44, then the microcomputer 16 allows the clock generator 22 to generate the second clock signal SCS of 5 MHz by controlling the clock generator 22 via the clock frequency change portion 18 (step 50). At this time, the formatter 26 inputs the normal video data NVD in the buffer 12 at a rate of 5 Mbps, by means of the second clock signal from the clock generator 22. As a result, the normal video data NVD recorded on the optical disc D is transferred at a rate of 5 Mbps by way of the formatter 26, the DSP 28, the channel modem 30, the recording portion 34 and the optical pickup device 32. Subsequently, the microcomputer 16 allows the rotational velocity controller 20 to rotate the spindle motor 24 at a speed of 50 rps by controlling the rotational velocity controller 20 (step 52). In response to a rotation of the spindle motor 24 at the speed of 50 rps, the optical disc D also is subject to rotate at a speed of 50 rps.

Figure 4:
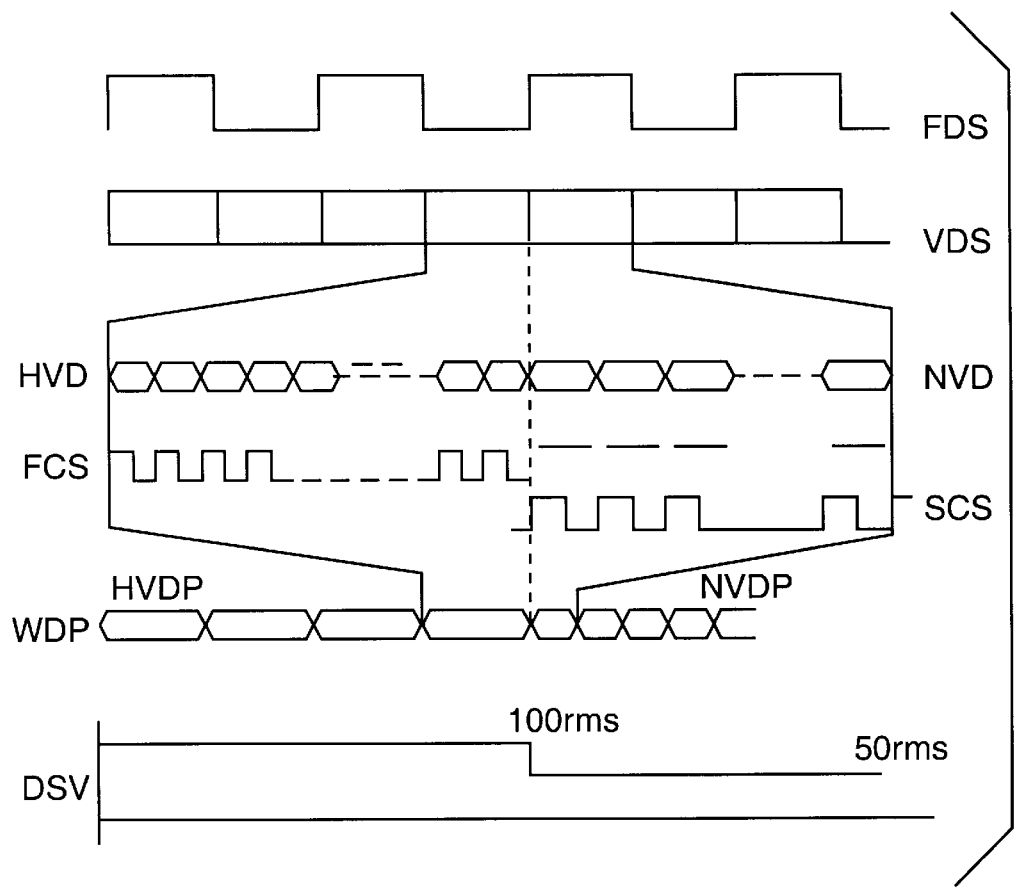
FIG. 4 shows output waveforms corresponding to parts of the optical disc recording and reproducing apparatus in FIG. 3.

After performing the above steps 46–48 or 50–52, the microcomputer 16 controls the optical pickup device 32 by allowing the optical pickup device 32 to record the data bit stream from the channel modem 30 on the optical disc D (step 54). As a result, an appropriate frame data pit train, such as HVDP or NVDP in FIG. 4, is generated in the optical disc D. Herein, HVDP represents a data pit train relative to one frame of high resolution video data, and NVDP represents a data pit train relative to one frame of normal video data.

Figure 7:
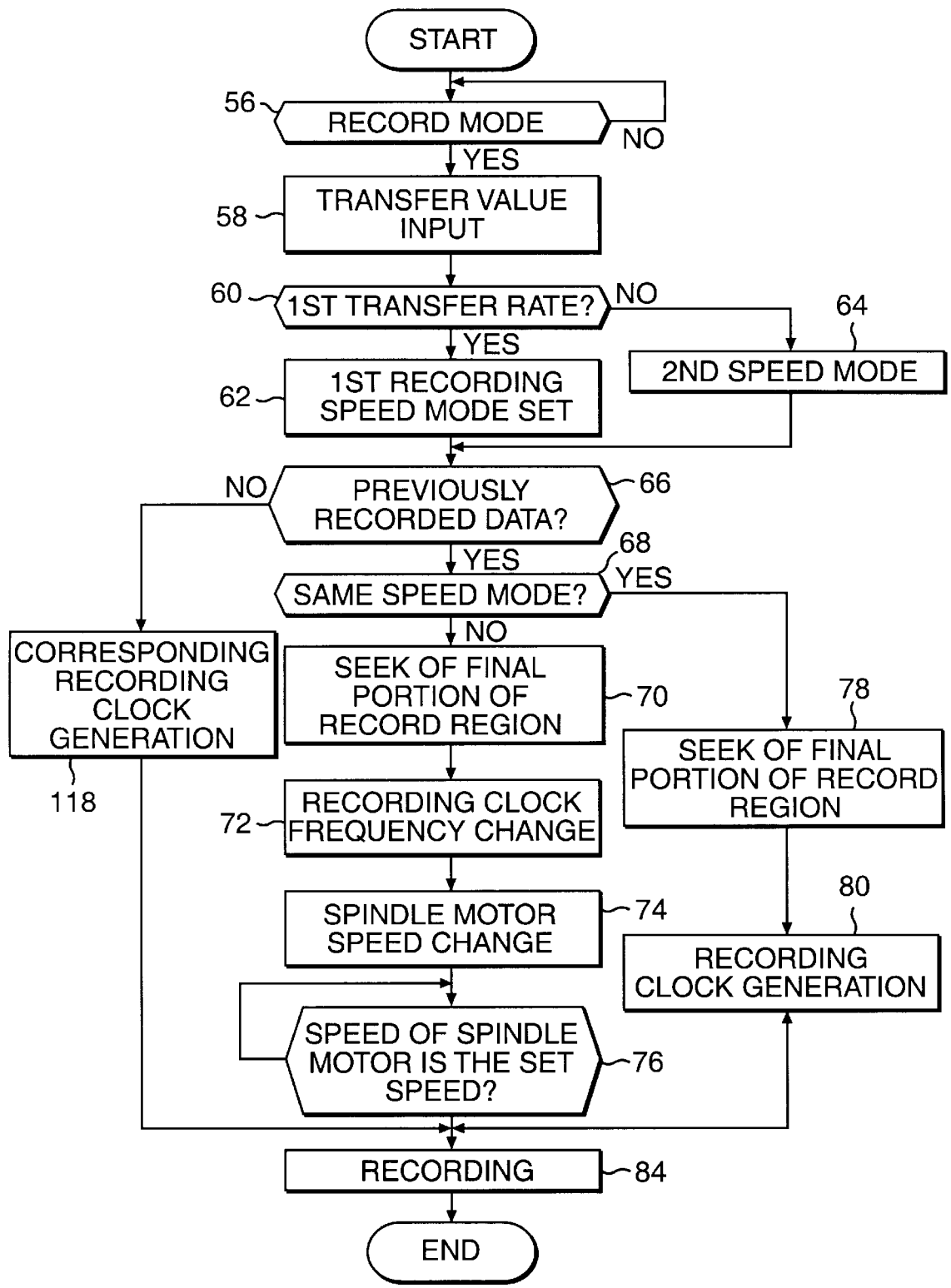
FIG. 7 is a flow chart for explaining a multi-rate recording method according to the second embodiment of the present invention.

FIG. 7 is a flow chart for explaining a multi-rate recording method according to the second embodiment of the present invention. The process in FIG. 7 is performed by the microcomputer 16 (shown in FIG. 3).

Referring now to FIG. 7, in step 56, the microcomputer 16 waits until a record instruction is inputted from the key input portion 14. If the record instruction is inputted in step 56, then the microcomputer 16 sets a record mode flag assigned in a part of register therein, and inputs a transfer rate value of video data from the transfer rate detector 10 (step 58).

In step 60, the microcomputer 16 decides, based on the transfer rate value, if the video data VDS on the input/output line 11 is high resolution video data HVD or normal video data NVD. When the transfer rate value is 10 Mbps, the microcomputer 16 decides that the high resolution video data HVD is being applied to the input/output line 11. When the transfer rate value is 5 Mbps, the microcomputer 16 decides that the normal video data NVD is being applied to the input/output line 11.

If it is decided that the high resolution video data HVD is applied to the input/output line 11 in step 60, then the microcomputer 16 sets the first recording speed mode flag assigned in a part of register therein, specifying that the data is to be recorded at a rate of 10 Mbps (step 62). On the other hand, if it is decided that the normal video data NVD is applied to the input/output line 11 in step 60, then the microcomputer 16 sets the second recording speed mode flag assigned in a part of register therein instead of the first recording speed mode flag, specifying that the data is to be recorded at a rate of 5 Mbps (step 64).

After performing the above step 62 or 64, the microcomputer 16 controls the spindle motor 24 via the rotational velocity controller 20 such that the spindle motor 24 rotates at a rate corresponding to the recording speed mode set in step 62 or 64. At the same time, the microcomputer 16 retrieves a table on the lead-in area of optical disc D inputted by way of the optical pickup device 32, the recording portion 36, channel modem 30 and the DSP 28, and decides whether there are a previously recorded video data or not (step 66). When a start address and an end address exist in the table, the microcomputer 16 decides that previously recorded data exists in the optical disc D. Otherwise, when an start address and an end address data do not exist in the retrieved table, the microcomputer 16 decides that previously recorded data does not exist in the optical disc D. The spindle motor 24 rotates at a rate of 100 rps when the first recording speed mode is set in step 62 while rotating at a rate of 50 rps when the second recording speed mode is set in step 64.

In step 66, if there is data recorded previously in the optical disc, then the microcomputer 16 compares a logical value of the recording speed mode flag with that of the transfer speed mode flag on the table, and decides whether the recording speed mode of the previously recorded data is identical to that of the data to be recorded (step 68). If the logical value of the recording speed mode flag is not identical to that of the transfer speed mode flag, it is judged that the recording speed mode of the previously recorded data is different from that of the video data to be recorded.

When the recording speed mode of the previously recorded data is different from that of the video data to be recorded in step 68, the microcomputer 16 allows the spindle motor 24 to be rotated at a speed corresponding to the recording speed mode of the previously recorded data by controlling the spindle motor 24 via the rotation velocity controller 20. The final portion of the recording region is then sought based on whether data is inputted from the DSP 28, making a track jump of the optical pickup device 32 if necessary (step 70). At this time, if the first recording speed mode was set in step 62, the spindle motor 24 rotates at a speed of 50 rps; whereas if the second recording speed mode was set in step 64, the spindle motor 24 rotates at a speed of 100 rps. Further, the microcomputer 16 allows the clock generator 22 to supply a clock signal to the formatter 26 having a frequency corresponding to the recording speed mode by controlling the clock generator 22 via the clock frequency change portion 18 (step 72). For example, when the first recording speed mode is set in step 62, the clock generator 22 applies the first clock signal FCS to the formatter 26. Accordingly, the high resolution video data on the input/output line 11 is delivered to the optical pickup device 32 at a transfer rate of 10 Mbps via the buffer 12, the formatter 26, the DSP 28, the channel modem 30 and the recording portion 34 in turn. Otherwise, when the second recording speed mode is set in step 64, the clock generator 22 applies the second clock signal SCS to the formatter 26. Thus, the normal video data NVD on the input/output line 11 is transferred at a transfer rate of 5 Mbps via the buffer 12, the formatter 26, the DSP 28, the channel modem 30 and the recording portion 34 in turn into the optical pickup device 32. The microcomputer 16 allows the spindle motor 24 to rotate at a speed corresponding to the recording speed mode set in step 62 or 64 by controlling the spindle motor 24 via the rotation velocity controller 20 (step 74), and then it waits until the rotation speed of the spindle motor 24 maintains a speed corresponding to the recording speed mode set in step 62 or 64 stabbly (step 76).

On the other hand, if the recording speed mode of the previously recorded data is identical to that of the video data to be recorded in step 68, then the microcomputer 16 seeks the final portion of the previously recorded region based on whether data is inputted from the DSP 28, making a track jump of the optical pickup device 32 if necessary (step 78). Further, the microcomputer 16 allows the clock generator 22 to supply a clock signal having a frequency corresponding to the recording speed mode with the formatter 26 (step 80).

Moreover, if the optical disc D does not appear to contain previously recorded data in step 66, then the microcomputer 16 allows the clock generator 22 to supply a clock signal having a frequency corresponding to the recording speed mode to formatter 26 by controlling the clock generator 22 via the clock frequency change portion 18 (step 118).

After performing the above step 76, 80 or 118, the microcomputer 16 allows the optical pickup device 32 to irradiate a relatively large energy of light beam switched under control of the recording portion 34 on the surface of the optical disc D by controlling the optical pickup device 32, such that the video data VDS is recorded on the optical disc D (step 84).

Figure 8:
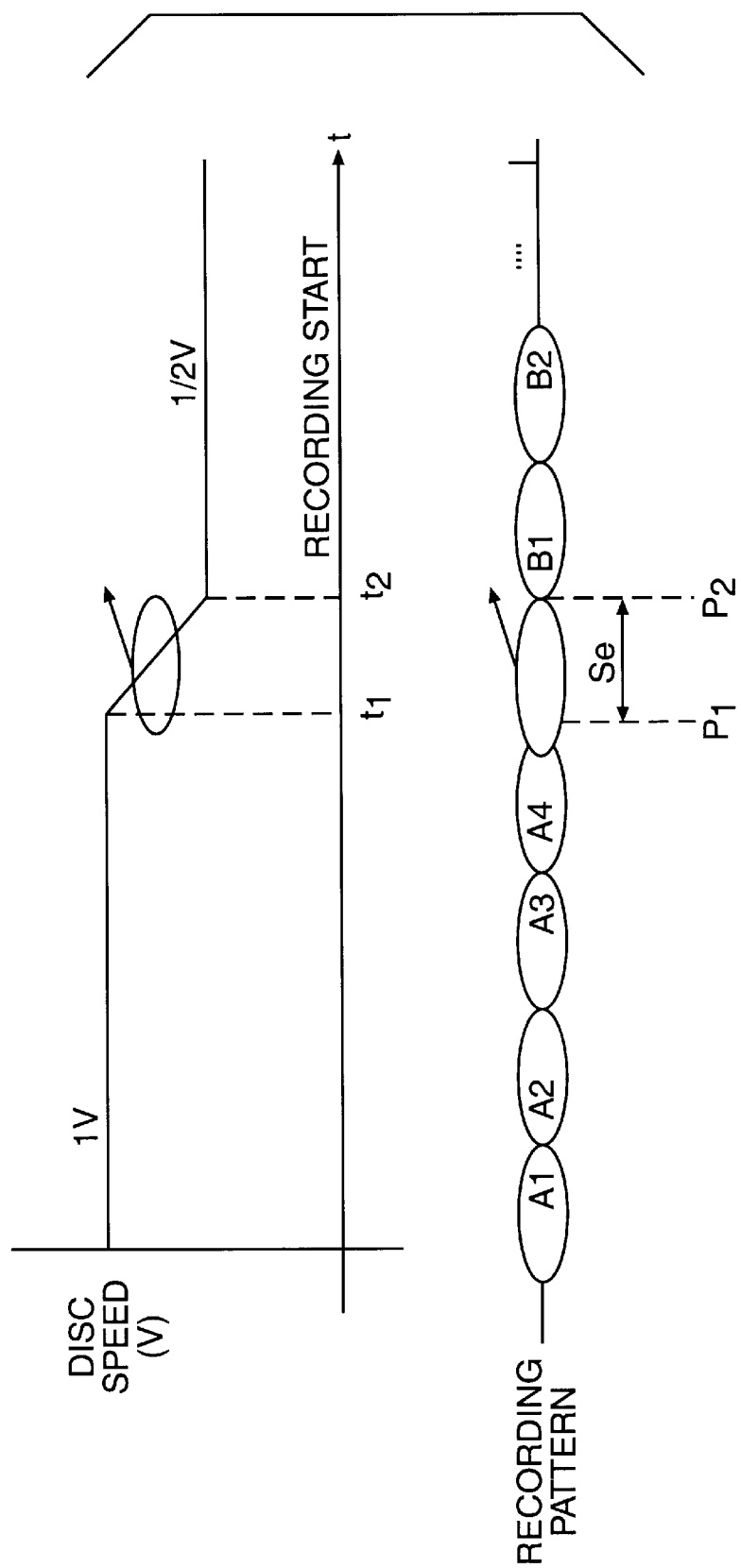
FIG. 8 is a diagram for explaining a recording start position of the optical disc and a pattern of the frame data pit train according to the multi-rate recording method in the second embodiment of the invention.

FIG. 8 explains a recorded state of the high resolution video data HVD in the first recording speed mode and the normal video data NVD in the second recording speed mode, when those video data are recorded on the optical disc D by the second embodiment of the present invention. In FIG. 8, a speed DSV of the spindle motor 22 remains at 100 rps until first time t1, at which time the final portion of the high resolution video data HVD in the first recording speed mode recorded on the optical disc D is retrieved. At time E1, the optical pickup device 32 is disposed on the first position p1, which is the final portion of the high resolution video data in the first recording speed mode.

Beginning at the first time t1, the rotation speed of the spindle motor 22 decreases slowly until a speed of 50 rps is achieved at second time t2. At the second time t2, the optical pickup device 32 moves from the first position p1, which is the final portion of the high resolution video data in the first recording speed mode, to the second position p2 spaced by a certain distance $s_e$ from the first position p1. The optical pickup device 32 records the normal video data NVD in the second recording speed mode from the second position p2 on the track. Thus, a non-recorded region having a length equal to the movement distance $s_e$ occurs during a rotation speed stabilization period t1-t2 of the spindle motor 22 between the high resolution video data HVD in the first recording speed mode and the normal video data NVD in the second recording speed mode.

Figure 9:
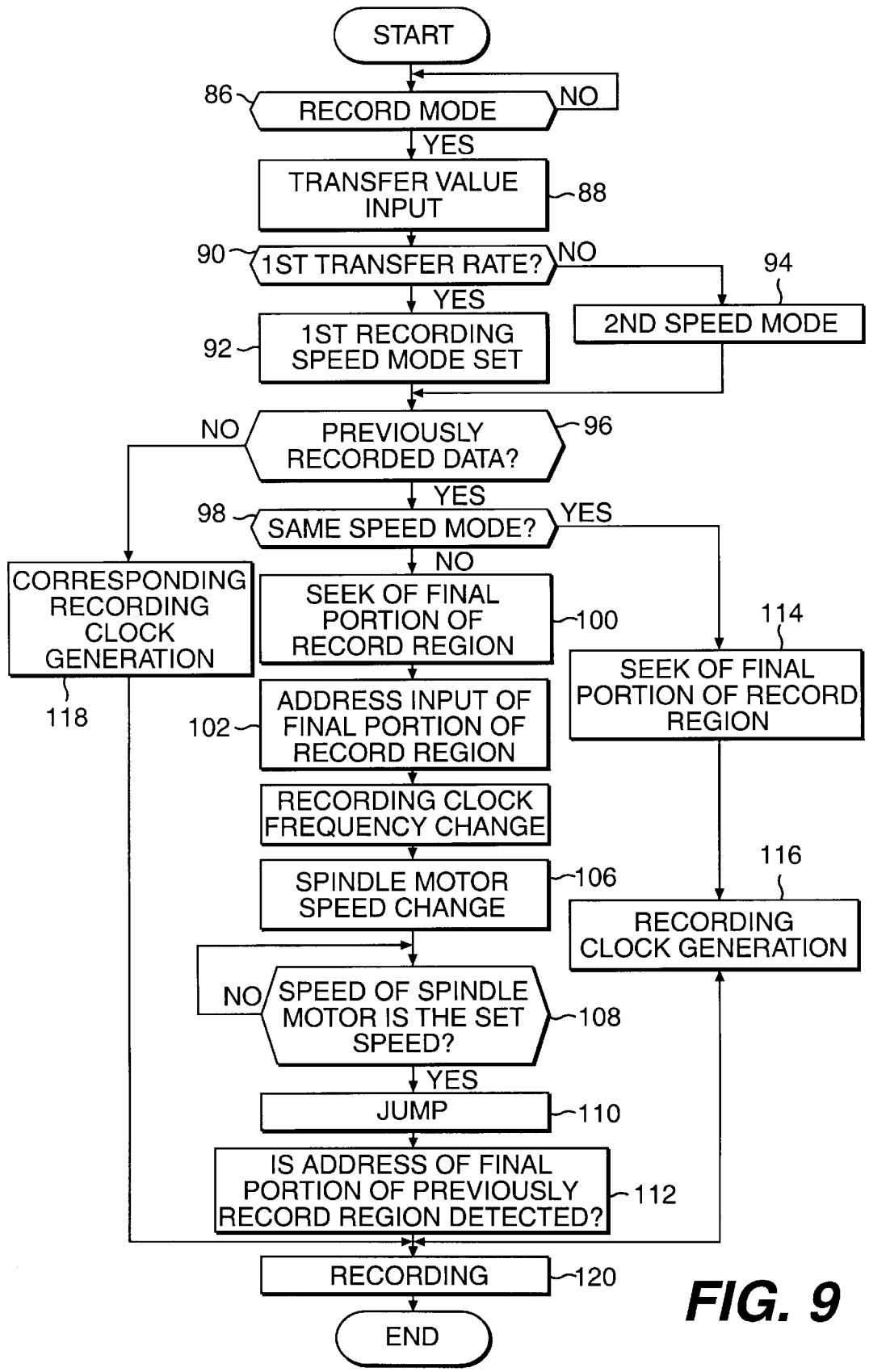
FIG. 9 is a flow chart for explaining a multi-rate recording method according to the third embodiment of the present invention.

FIG. 9 is a flow chart for explaining a multi-rate recording method according to the third embodiment of the present invention. The process in FIG. 9 is performed by the microcomputer 16 (shown in FIG. 3).

Referring now to FIG. 9, in step 86, the microcomputer 16 waits until a record instruction is inputted from the key input portion 14. If the record instruction is inputted in step 86, then the microcomputer 16 sets a record mode flag assigned in a part of register therein, and inputs a transfer rate value of video data from the transfer rate detector 10 (step 88).

In step 90, the microcomputer 16 decides based on the transfer rate value whether the video data VDS on the input/output line 11 corresponds to high resolution video data HVD or normal video data NVD. When the transfer rate value is 10 Mbps, the microcomputer 16 decides that the high resolution video data HVD is being applied to the input/output line 11. When the transfer rate value is 5 Mbps, the microcomputer 16 decides that the normal video data NVD is being applied to the input/output line 11. If it is decided that the high resolution video data HVD is applied to the input/output line 11 in step 90, then the microcomputer 16 sets the first recording speed mode flag assigned in a part of register therein, specifying that the data is to be recorded at a rate of 10 Mbps (step 92). On the other hand, if it is decided that the normal video data NVD is applied to the input/output line 11 in step 90, then the microcomputer 16 sets the second recording speed mode flag assigned in a part of register therein instead of the first recording speed mode flag, specifying that the data is to be recorded at a rate of 5 Mbps (step 94).

After performing the above step 92 or 94, the microcomputer 16 controls the spindle motor 24 via the rotational velocity controller 20 such that the spindle motor 24 rotates at a rate corresponding to the recording speed mode set in step 92 or 94. At the same time, the microcomputer 16 retrieves a table on the lead-in area of optical disc D inputted by way of the optical pickup device 32, the recording portion 36, channel modem 30 and the DSP 28, and decides whether there exists previously recorded data or not (step 96). When a start address and an end address exist in the table, the microcomputer 16 decides that the data recorded previously exists in the optical disc D. Otherwise, when an start address and an end address do not exist in the table, the microcomputer 16 decides that previously recorded data does not exist in the optical disc D. The spindle motor 24 rotates at a rate of 100 rps when the first recording speed mode is set in step 92 while rotating at a rate of 50 rps when the second recording speed mode is set in step 94.

In step 96, if there is data recorded previously in the optical disc, then the microcomputer 16 compares a logical value of the recording speed mode flag with that of the transfer speed mode flag on the table, and decides whether the recording speed mode of the previously recorded data is identical to that of the data to be recorded (step 98). If the logical value of the transfer speed mode flag is not identical to that of the recording speed mode flag, it is judged that the recording speed mode of the previously recorded data is different from that of the video data to be recorded.

When the recording speed mode of the previously recorded data is different from that of the video data to be recorded in step 98, the microcomputer 16 allows the spindle motor 24 to be rotated at a speed corresponding to the recording speed mode of the previously recorded data by controlling the spindle motor 24 via the rotation velocity controller 20. The final portion of the recording region is then sought based on whether data is inputted from the DSP 28, with making a track jump of the optical pickup device 32 if necessary (step 100). At this time, if the first recording speed mode was set in step 92, the spindle motor 24 rotates at a speed of 50 rps; whereas if the second recording speed mode was set in step 94, the spindle motor 24 rotates at a speed of 100 rps. Further, the microcomputer 16 inputs an address relative to the final portion of the previously recorded region from the DSP 28 (step 102), and thereafter allows the clock generator 22 to supply a clock signal having a frequency corresponding to the recording speed mode with the formatter 26 by controlling the clock generator 22 via the clock frequency change portion 18 (step 104). For example, when the first recording speed mode is set in step 92, the clock generator 22 applies the first clock signal FCS to the formatter 26. Accordingly, the high resolution video data on the input/output line 11 is delivered to the optical pickup device 32 at a transfer rate of 10 Mbps via the buffer 12, the formatter 26, the DSP 28, the channel modem 30 and the recording portion 34. Otherwise, when the second recording speed mode is set in step 94, the clock generator 22 applies the second clock signal SCS to the formatter 26. Thus, the normal video data NVD on the input/output line 11 is transferred into the optical pickup device 32 at a transfer rate of 5 Mbps via the buffer 12, the formatter 26, the DSP 28, the channel modem 30 and the recording portion 34. The microcomputer 16 allows the spindle motor 24 to rotate at a speed corresponding to the recording speed mode set in step 92 or 94 by controlling the spindle motor 24 via the rotation velocity controller 20 (step 106), and then it waits until the rotation speed of the spindle motor 24 maintains a speed corresponding to the recording speed mode set in step 92 or 94 stabbly (step 108).

In step 108, when the rotation speed of the spindle motor 24 arrives at a speed corresponding to the recording speed mode set in step 92 or 94, the microcomputer 16 moves the optical pickup device 32 into the previous track of the optical disc D (step 110). Next, the microcomputer 16 waits until an address relative to the final portion of the recording region from the DSP 28 (step 112).

On the other hand, if the recording speed mode of the previously recorded data is identical to that of the video data to be recorded in step 98, then the microcomputer 16 seeks the final portion of the previously recorded region based on whether data is inputted from the DSP 28, making a track jump of the optical pickup device 32 if necessary (step 114). Further, the microcomputer 16 allows the clock generator 22 to supply a clock signal having a frequency corresponding to the recording speed mode with the formatter 26 (step 116).

Moreover, if the optical disc D does not appear to contain previously recorded data in step 96, then the microcomputer 16 allows the clock generator 22 to supply a clock signal having a frequency corresponding to the recording speed mode to formatter 26 by controlling the clock generator 22 via the clock frequency change portion 18 (step 118).

After performing the above step 112, 116 or 118, the microcomputer 16 allows the optical pickup device 32 to irradiate a relatively large energy of light beam, switched under control of the recording portion 34, on the surface of the optical disc D by controlling the optical pickup device 32. As such, the video data VDS is recorded on the optical disc D (step 120).

Figure 10:
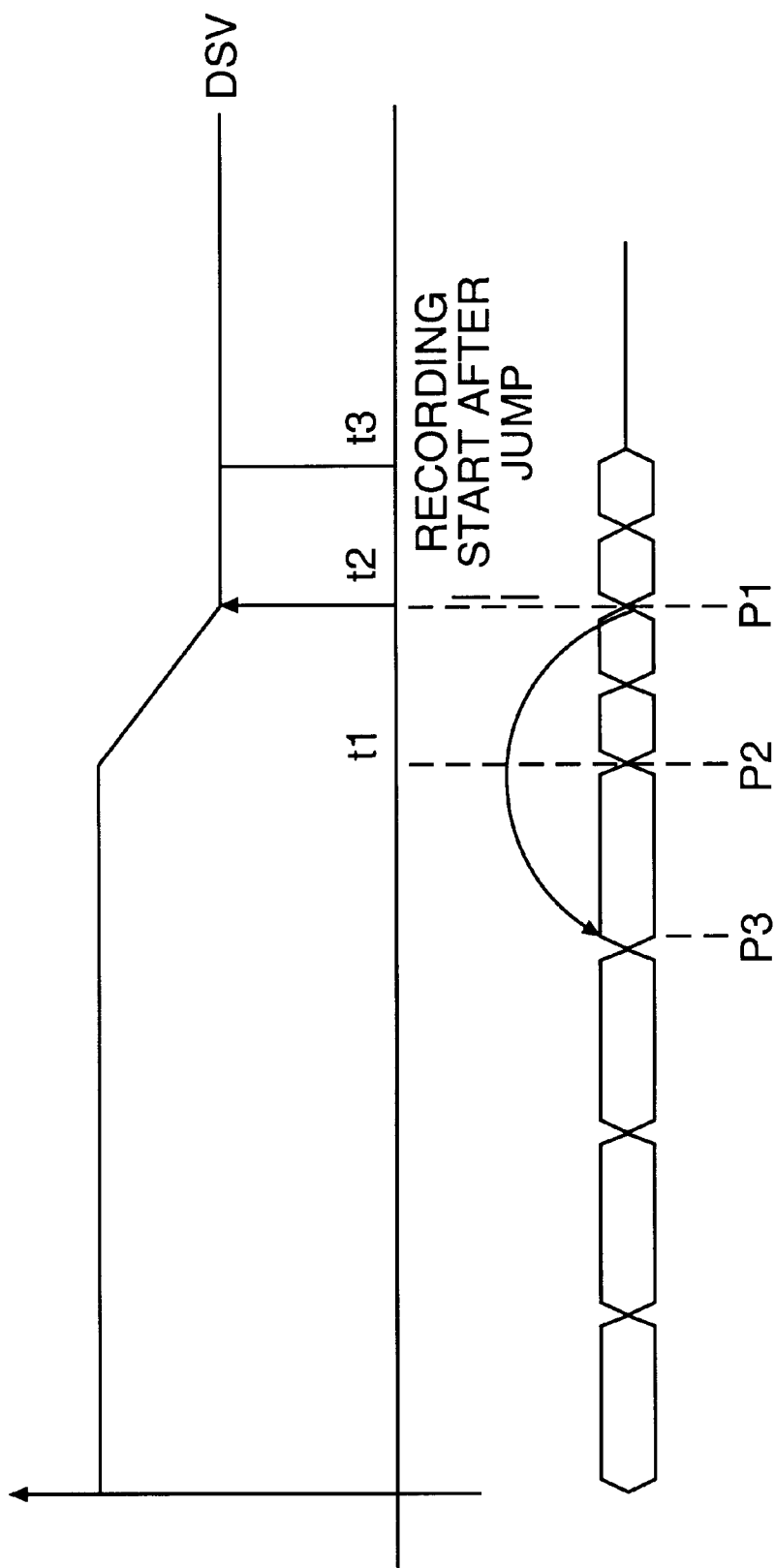
FIG. 10 is a diagram for explaining a recording start position of the optical disc and a pattern of the frame data pit train according to the multi-rate recording method in the third embodiment of the invention.

FIG. 10 explains a recorded state of the high resolution video data HVD in the first recording speed mode and the normal video data NVD in the second recording speed mode, when those video data are recorded on the optical disc D by the third embodiment of the present invention. In FIG. 10, a speed DSV of the spindle motor 22 remains at 100 rps until first time t1, at which time the final portion of the high resolution video data HVD in the first recording speed mode recorded on the optical disc D is retrieved. At time t1, the optical pickup device 32 is disposed on the first position p1, which is the final portion of the high resolution video data in the first recording speed mode.

Beginning at the first time t1, the rotation speed DSV of the spindle motor 22 decreases slowly until a speed of 50 rps is achieved at second time t2. At the second time t2, the optical pickup device 32 moves from the first position p1, which is the final portion of the high resolution video data in the first recording speed mode, to the second position p2 spaced by a certain distance $s_e$ from the first position p1.

The optical pickup device 32 makes a track jump by a certain distance $s_b$ from the second position p2 on the track to be positioned the third position p3 preceding the first position p1. Further, the optical pickup device 32 records the normal video data NVD in the second recording speed mode from the third time t3 arrived at the high resolution video data HVD in the first recording speed mode on the track of the optical disc D. Thus, the normal video data NVD in the second recording speed mode is recorded from the final portion of the high resolution video data HVD in the second recording speed mode such that non-recorded region is not generated.

As described above, according to a multi-rate recording method and apparatus of the present invention, the rotation velocity of the optical disc and the processing speed of data can be controlled in accordance with the transfer rate of the data to be recorded such that the unnecessary data is not recorded on the optical disc. As a result, the multi-rate recording method and apparatus according to the present invention provides an advantage in that it can improve recording efficiency of optical disc and the recording time thereof dramatically.

Although the present invention has been described by the preferred embodiments illustrated in drawings hereinbefore, it is apparent from the above description to those ordinarily skilled in the art that various changes and modifications of the invention are possible without departing from the spirit thereof. For instance, it may be suggested that the buffer shown in FIG. 3 is disposed between the formatter 26 and the DSP 28 or between the DSP 28 or the channel modem 30 to supply the clock signal generated at the clock generator 22 with the DSP 28 or the channel modem 30, thereby controlling the processing speed of video data. Also, while the present invention has been described to be limited to the video data, it is to be understood that it may be applied to other data such as text data and packet data, etc. Accordingly, the scope of the invention should be determined not by the embodiments illustrated and described, but by the appended claims and their equivalents.

What is claimed is:

1. A multi-rate optical disc recording method for recording a digital signal from a digital signal source on an optical disc, comprising:

detecting a transfer rate of said digital signal supplied from the digital signal source;

controlling a rotational velocity of the optical disc in accordance with said transfer rate of said digital signal;

controlling a frequency of a recording clock in accordance with said transfer rate of said digital signal; and recording said digital signal on the optical disc at said transfer rate of said digital signal, wherein said digital signal has any one of at least two transfer rates and said rotational velocity of the optical disc is controlled to achieve a velocity corresponding to the one of the at least two transfer rates.

2. A multi-rate optical disc recording apparatus, comprising:

recording means for recording a digital signal from a digital signal source on an optical disc;

recording mode determining means for determining a recording speed of said digital signal; and data processing means for controlling a transfer rate of the digital signal being transferred from said digital signal source to said recording means, said transfer rate being controlled based on said recording speed determined by said recording mode determining means, wherein said recording speed is set to one of at least two recording speed modes, and wherein said recording means is driven by a recording clock having a frequency corresponding to the one of the at least two recording speed modes.

3. A multi-rate optical disc recording apparatus, comprising:

recording mode determining means for determining a recording speed of a digital signal supplied from a digital signal source;

means for recording said digital signal on an optical disc at said recording speed by said recording mode determining means; and means for controlling a rotational velocity of the optical disc based on said recording speed determined by said recording mode determining means, wherein said recording speed is one of at least two recording speed modes, and said rotational velocity of the optical disc is controlled to achieve one of two rotational velocities, and wherein said recording means is driven by a recording clock having a frequency corresponding to the one of the at least two recording speed modes.

4. A multi-rate optical disc recording apparatus, comprising:

means for detecting a transfer rate of a digital signal supplied from a digital signal source;

optical disc driving means for rotating the optical disc based on said transfer rate of said digital signal detected by said transfer rate detecting means; and means for recording said digital signal on the optical disc at said transfer rate detected by said transfer rate detecting means, wherein said digital signal has one of at least two transfer rates and the optical disc is rotated at one of two rotational velocities, and wherein said recording means is driven by a recording clock having a frequency corresponding to the one of the at least two transfer rates.

* * * * *